(12) United States Patent
Cisar et al.

(10) Patent No.: US 7,125,625 B2
(45) Date of Patent: Oct. 24, 2006

(54) ELECTROCHEMICAL CELL AND BIPOLAR ASSEMBLY FOR AN ELECTROCHEMICAL CELL

(75) Inventors: Alan J. Cisar, Cypress, TX (US);
Craig C. Andrews, College Station, TX (US); Charles J. Greenwald, Bryan, TX (US); Oliver J. Murphy, Bryan, TX (US); Chris Boyer, Houston, TX (US); Rattaya Chow Yalamanchili, College Station, TX (US); Carlos E. Salinas, Bryan, TX (US)

(73) Assignee: Lynnetech, Inc., College Station, TX (US)

( * ) Notice: Subject to any disclaimer, the term of this patent is extended or adjusted under 35 U.S.C. 154(b) by 242 days.

(21) Appl. No.: 10/448,974

(22) Filed: May 30, 2003

(65) Prior Publication Data

US 2003/0232234 A1 Dec. 18, 2003

Related U.S. Application Data

(60) Provisional application No. 60/384,659, filed on May 31, 2002.

(51) Int. Cl.
*H01M 2/02* (2006.01)
*H01M 2/08* (2006.01)
*H01M 8/12* (2006.01)

(52) U.S. Cl. .............................. 429/35; 429/26; 429/34
(58) Field of Classification Search .................. 429/26, 429/34, 35
See application file for complete search history.

(56) References Cited

U.S. PATENT DOCUMENTS

| | | | |
|---|---|---|---|
| 5,108,849 A | 4/1992 | Watkins et al. | |
| 5,372,689 A | 12/1994 | Carlson et al. | |
| 6,022,634 A | 2/2000 | Ramunni et al. | |
| 6,037,074 A | 3/2000 | Mercuri et al. | |
| 6,054,228 A | 4/2000 | Cisar et al. | |
| 6,146,780 A | 11/2000 | Cisar et al. | |
| 6,245,453 B1 * | 6/2001 | Iwase et al. | 429/34 |

(Continued)

FOREIGN PATENT DOCUMENTS

JP     05074469     3/1993

(Continued)

OTHER PUBLICATIONS

"Fuel Cell Systems"; Leo J.M.J. Blomen and Michael N. Mugerwa: Plenum Press; New York and London; pp. 493-530.

(Continued)

*Primary Examiner*—Dah-Wei Yuan
(74) *Attorney, Agent, or Firm*—Streets & Steele; Jeffrey L. Streets (57) ABSTRACT

A bipolar assembly for use in electrochemical cell stacks, especially stacks operated at low pressure. The bipolar assembly is lightweight and provides a "post-type" flow field that operates with a low pressure drop. The bipolar assembly comprises a gas barrier having an array of electronically conducting posts disposed approximately perpendicular to the gas barrier. Each end of the posts is in electrical communication with the surface of an electrode. Because the bipolar assembly separates a cathode from an anode, the posts contact an anode electrode on one end and a cathode electrode on the other end. The posts provide current conduction through the stack as well as provide the flow fields for the electrochemical reactants. Optionally, the bipolar assembly may contain cooling fluid channels formed by adding additional gas barriers to the bipolar assembly. The space between the gas barriers form a channel through which cooling fluids may be circulated.

53 Claims, 5 Drawing Sheets

U.S. PATENT DOCUMENTS

| | | |
|---|---|---|
| 6,338,492 B1 | 1/2002 | Schilling et al. |
| 6,511,766 B1 | 1/2003 | Loutfy |
| 6,517,338 B1 | 2/2003 | Kouga |
| 6,670,066 B1 * | 12/2003 | Tsuji et al. .................. 429/34 |
| 2001/0006745 A1 | 7/2001 | Bronoel et al. |
| 2002/0045086 A1 | 4/2002 | Tsuji et al. |
| 2002/0055027 A1 | 5/2002 | Inoue et al. |
| 2002/0065000 A1 | 5/2002 | Morozumi |
| 2003/0027030 A1 * | 2/2003 | Kawashima et al. .......... 429/34 |
| 2003/0152821 A1 * | 8/2003 | Lisi et al. .................... 429/34 |
| 2003/0165720 A1 * | 9/2003 | DeFilippis .................. 429/13 |

FOREIGN PATENT DOCUMENTS

| | | |
|---|---|---|
| JP | 2000133282 | 12/2000 |
| JP | HEI 5-74469 | 3/2003 |

OTHER PUBLICATIONS

"Solid Polymer Fuel Cell Research At ECN"; R.K.A.M. Mallant, F.G.H. Koene, C.W.G. Verhoeve and A. Ruiter; Netherlands Energy Research Foundation, ECN; Petten, The Netherlands; pp. 503-506.

* cited by examiner

Hexagonal Pattern

Diamond Pattern

Square Pattern

Random

ELECTROCHEMICAL CELL AND BIPOLAR ASSEMBLY FOR AN ELECTROCHEMICAL CELL

This application claims the benefit of the U.S. Provisional Application No. 60/384,659 filed on May 31, 2002.

BACKGROUND OF THE INVENTION

1. Field of the Invention

The present invention provides an electrochemical cell and subassembly for an electrochemical cell, particularly electrochemical stacks.

2. Description of the Related Art

Electrochemical cells include, but are not limited to, fuel cells, electrolysis or electrolyzer cell, electrochemical synthesis cells, electrochemical oxygen concentrators (also known as electrochemical oxygen pumps), and electrochemical hydrogen concentrators (also known as electrochemical hydrogen pumps). Electrochemical cell stacks are made up of individual electrochemical cells that are connected in series. The structure and operation of these electrochemical cells have many common aspects, which will be discussed herein in the context of a fuel cell stack.

The primary components of a proton exchange membrane (PEM) fuel cell stack are the membrane and electrode assemblies (MEAs), gas diffusion layers, and bipolar plate/flow field assemblies. These components are assembled in a "stack" with each gas diffusion layer/MEA/gas diffusion layer in the stack separated by a bipolar assembly and each end of the stack having an endplate. Conventionally, the stack is held together under compression, such as by threaded tie rods or a series of bands.

Each of the cells in the stack has an MEA made up of a cathode electrode in intimate contact with one side of a proton exchange membrane (PEM) and an anode electrode in intimate contact with the opposite side of the proton exchange membrane. In the case of a hydrogen consuming PEM fuel cell, the anode electrode comprises an electrocatalyst layer and a porous hydrophobic gas diffusion layer/backing layer. Similarly, the cathode electrode of the PEM fuel cell comprises an electrocatalyst layer and a porous hydrophobic gas diffusion layer/backing layer. For a typical PEM electrolysis cell, the anode electrode comprises an electrocatalyst layer and a porous substrate/current collector material. Similarly, the cathode electrode of a typical PEM electrolysis cell comprises an electrocatalyst layer and a porous substrate/current collector material.

The bipolar plate/flow field assemblies are located between adjacent gas diffusion layer/MEA/gas diffusion layer assemblies and provide flow fields or chambers through which reactants are channeled across the face of each electrode while maintaining separation of the reactants and products. The bipolar plate/flow field assemblies and, where applicable, gas diffusion structures that provide support and backing to the electrocatalyst layers, serve to conduct electricity between each of the cells in the stack and further to ensure that the reactant fluids are evenly distributed over the active portions of the electrodes. Additionally, bipolar plates may be constructed with internal channels to allow the use of cooling fluids for cooling the electrochemical stack if desired.

An assembled electrochemical cell stack can become quite large and heavy with most of the weight being associated with the bipolar plate/flow field assemblies. A well-known challenge to broad usage of PEM fuel cell stacks is that the weight of the stack can become so great that the corresponding power-to-weight ratio becomes unacceptably low. Therefore, many designs of the bipolar plate/flow field assemblies have been developed to reduce the overall weight of the stacks and increase the power-to-weight ratios. These designs have included, for example, use of metal foam in the construction of bipolar plate/flow field assemblies, as described in U.S. Pat. No. 6,146,780 to Cisar et al., and hereby incorporated by reference, and use of low-density metals that have been coated with a thin layer of a more noble metal for protection against corrosion, as described in U.S. Pat. No. 6,203,936 to Cisar et al., and hereby incorporated by reference in its entirety.

While these reduced-weight bipolar plate/flow field assemblies have resulted in electrochemical fuel cell stacks having good power-to-weight ratios when the current densities are greater than 400 mA/cm$^2$, these designs are not as effective to provide efficient fuel cell stacks when the operating pressure of the reactants is low, such as in a fuel cell using ambient air on aircraft flying at high altitudes.

What is needed is a fuel cell stack that provides a lightweight bipolar assembly for an electrochemical cell stack. It would be desirable if the electrochemical cell stack yielded an improved power-to-weight ratio. It would also be desirable if the fuel cell would operate well at low reactant pressures, i.e., at pressures less than one atmosphere. It would be of further benefit if the electrochemical cell could operate with minimal pressure drop through the airside flow field to maintain as high a pressure throughout the system as possible.

SUMMARY OF THE INVENTION

The present invention provides a bipolar assembly for use in an electrochemical cell stack. The assembly comprises a gas barrier and an array of electronically conductive protrusions disposed across the surface of the gas barrier at spaced apart intervals to form reactant flow fields on opposite surfaces of the gas barrier. The protrusions extend outward from the gas barrier and may take many forms, but the preferred protrusions are posts. Each of the mechanically rigid and electronically conductive posts enables electrical communication therethrough, such as between an anode of a first cell adjacent a first side of the assembly and a cathode of a second cell adjacent a second side of the assembly. The posts and gas barrier may be integrally formed in a single step or assembled in a sequence of steps. For example, if the posts are disposed after the gas barrier has been fabricated, the posts may be inserted into an array of regularly shaped holes or regularly shaped indentations in the gas barrier, wherein the posts have a cross section approximately matching the cross section of the regularly shaped holes or regularly shaped indentations. The posts must be sealed to the gas barrier to provide a gas tight barrier. As an alternative example, the gas barrier may be cast or formed in place around the posts.

In one embodiment, the posts may be formed integrally with the gas barrier by deforming the gas barrier in such a manner that the gas barrier material serves three functions including maintaining reactant gas separation, providing flow field channels, and conducting electrons between two cells in a stack. One method of forming the gas barrier and the posts from a sheet of porous material or 'metal foam' includes crushing select portions of the sheet. As an example of this technique, a die set could be used to provide surface features, e.g., posts, in predetermined regions while crushing the foam to a near solid surface between the posts. The near solid surface of the porous foam would then be sealed using an epoxy, resin, or other suitable material.

An alternative method for integrally forming the posts and the gas barrier of the assembly includes molding the gas barrier with posts as a single unit from an electronically conductive material. An example of this approach is the injection molding of the assembly from a polymer that is filled with sufficient conductive material to render the resulting composite conductive.

In another embodiment, the gas barrier may be formed independently of the posts by casting the gas barrier around the array of posts. This may be accomplished, for example, by embedding the lower portion of the posts in a sacrificial material, creating a gas barrier layer on the top surface of the sacrificial material, curing or hardening the gas barrier layer, and, dissolving, or otherwise removing the sacrificial layer leaving the freestanding gas barrier secured to the posts. Furthermore, multiple gas barriers may be cast or formed around the posts to create a multi-layer structure that maintains separation between an anode flow field, a heating or cooling flow field, and a cathode flow field. This may be accomplished, for example, by repeating the process described immediately above. The gas barrier can also be formed by producing a reusable mold with pockets for the posts, placing the posts in the pockets, casting the gas barrier around the post using a polymer, polymer bonded metals, polymer bonded ceramics, or low melting metals, and removing the assembly from the reusable mold after the barrier has solidified. The gas barrier may also be made of an elastomeric material providing a self-sealing structure whereby holes smaller than the posts are provided in the gas barrier and, after insertion of the posts, the gas barrier forms gas-tight seals around the posts.

Optionally, the polymer can be filled with an electronically conductive component to yield a conductive composite that serves as both the gas barrier and a conductive link between the conduction posts. In accordance with a similar option, the gas barrier can be fabricated from an electronically conductive polymer, such as polyanaline or polypyrrole.

In still a further embodiment, the gas barrier may include a polymer that promotes, or at least permits, the flow of water through the barrier while preventing the passage of gases. Accordingly, water produced at the cathode, and normally rejected in the exhaust, passes through the barrier where it humidifies the fuel being consumed. This is advantageous because it promotes the full humidification of the PEM membrane, which minimizes its resistance to proton flow. A moisture transfer capability like this can be achieved by utilizing a single phase polymer capable of absorbing substantial amounts of water or by producing a porous barrier having pores filled with such a polymer or with another substance that promotes the transfer of water. Examples of polymers that absorb or conduct moisture include perfluorosulfonic acids (such as Nafion), sulfonated polystyrene, sulfonated trifluorostyrene, polyacrylamides, and similar polymers. The gas barrier may also be made from a polymer blend, where one or more of the polymer components in the blend permits the passage of water through the composite. Alternatively, the water conducting polymer in a blend may be replaced with any other water conducting material, such as a hydrophilic inorganic material like hydrous silica or alumina.

A related embodiment includes fabricating the gas barrier (s) from a non-polymeric porous material, such as metal or ceramic, and filling the pores with a hydrophilic, water transporting polymer or a hydrophilic inorganic material and the use of hydrophilic inorganic materials, such as hydrous silica or alumina, as a filler in a polymer to render the resulting composite water conductive to facilitate water transfer through the barrier. The forgoing descriptions are exemplary, and not comprehensive. Other variations will also be apparent to those skilled in the art. Other methods may be used to produce the same end product, and are considered to be part of this invention.

If metallic posts are inserted into holes in a metallic gas barrier, the bipolar plate further includes seals formed around the posts, such as those formed by metallurgically bonding the posts to the gas barrier. The seal may be formed with a metal having a melting point substantially lower than the metals of the posts or the gas barrier. As noted above, the barrier may be solid, or porous, with the pores filled with a material that promotes the transfer of water from the cathode to the anode.

Regardless of the material used to fabricate the gas barrier and the posts when the posts are inserted into holes in the gas barrier, the posts may be sealed with a polymeric adhesive material. The polymeric adhesive material is selected from epoxies, metal-filled epoxies, carbon-filled epoxies, silicones, urethanes, acrylics, neoprenes, and butadienes as described in U.S. patent application Ser. No. 09/237,428 filed on Jan. 26, 1999, and hereby incorporated by reference. The polymeric adhesive can also be comprised of an intrinsically electronically conductive polymer such as polyanaline or polypyrrole.

The gas barrier may be made of electronically conducting or non-conducting material. If, however, the posts are inserted into indentations in the gas barrier, i.e., the gas barrier extends continuously across the face of the assembly, then the gas barrier should be electronically conductive. An electronically conducting gas barrier may provide some lateral smoothing of electrical potential, but the primary function of any gas barrier to maintain a barrier between reactant gas streams. Of secondary importance, the gas barrier may allow water passage. Because the posts of the invention occupy only a minor portion of the surface area of the assembly, the gas barrier can provide water conductivity or water transport over a major portion of the surface area of the assembly. Furthermore, the gas barrier can be made very thin to promote water permeability.

The posts may be of any cross sectional shape including, for example, shapes selected from circular, square, rectangular, triangular, diamond, oval, ovoid, pentagonal, hexagonal or heptagonal. Other arbitrary shapes may be used as well. Furthermore, the posts may have different shapes or sizes on either side of the gas barrier and may extend into the anode and cathode regions by varying amounts. Still, the individual posts on a single bipolar plate may have different shapes or sizes, such as to direct reactant flow. The posts may be arranged in any pattern including, for example, a triangular grid, rectangular grid, or hexagonal arrangement (without touching). The distance between the posts should be greater than 1 mm, and may range from between about 1 mm to about 3 cm, but preferably about 1 cm. The longest dimension through each post is preferably between about $\frac{1}{4}$ inch and about $\frac{1}{16}$ inch. The flow fields formed by the posts for the reactant fluids preferably have a void volume of between about 50% and about 99% of the total volume defined by the space between the surface of the gas barrier and the surface of the electrodes that make contact with the posts. Preferably, the flow fields have a void volume of between about 70% and about 99% of the total volume defined by the space between the surface of the gas barrier and the surface of the electrodes that make contact with the posts, and more preferably between about 85% and about 95%.

In a preferred embodiment, the anode and the cathode each have a gas diffusion structure that includes an electronically conductive grid, wherein the grid acts as a current collector. The posts are provided in electrical communication with the grids. The grid may be laid against the gas diffusion material, embedded within the surface layers of the gas diffusion material, or embedded within the bulk of the gas diffusion material, as described in U.S. Pat. Nos. 6,054,228 and 6,410,180 to Cisar et al., and hereby incorporated by reference in their entirety. The grid is preferably made of material selected from nickel, copper, aluminum, stainless steel, graphitized carbon, gold, titanium, palladium, ruthenium, platinum and combinations thereof. Preferably, the grid is a form selected from perforated flat sheet, perforated foil, woven wire cloth, non-woven conductive cloth, expanded metal sheet and three-dimensional open cell metal foam, wherein the perforations or openings have a maximum dimension that is less than a smallest dimension of the post's cross section.

The posts may be made of any electronically conductive material, such as a material selected from nickel, copper, aluminum, stainless steel, graphitized carbon, gold, titanium, palladium, ruthenium, platinum, graphitic carbon, other conductive metals, magnesium, carbon resin composites, metal filled composites and combinations thereof. The posts may be plated as described in U.S. Pat. No. 6,203,936 to Cisar et al., hereby incorporated by reference in its entirety. It is not required that all posts be made from the same material or that all posts are electronically conductive. A portion of the posts may serve as electronic conductors through the gas barrier while other posts may serve as mechanical support without being electronically conductive.

Furthermore, the posts may be either solid or porous. With any given material a solid post will have the highest electrical conductivity, but it will also be the heaviest, while a porous post will reduce the weight, with some loss of conductivity. These factors must be weighed in the development of any design. If porous posts are selected, then provisions must be made to insure that the post does not present a potential leak between fuel and oxidizer. This provision can be the use of a water conducting filler, as described above, or it can be a barrier produced by sealing the pores in all or part of the post with a non-water conducting filler. In addition, a porous post fabricated with closed cell porosity will provide its own barrier. However, in balancing the competing interests of high electronic conductivity and low weight of the posts, it is perhaps most import that the posts have high electronic conductivity.

When it is desired to have a gas barrier that is electronically conductive, the gas barrier may be made of a material selected from aluminum, titanium, magnesium, copper, nickel, stainless steel or other metals, graphitic carbon sheet, conductive polymer composites, or intrinsically electronically conductive polymers. When the gas barrier is non-electronically conductive, the gas barrier may, for example, be made of polymer such as polycarbonate, polytetrafluoroethylene, polyamide, polyethersulfone, or an elastomer selected from viton, EPDM (ethylene-propylene-diene-methylene), silicone, polyetherimides, nylon, nitrile, and combinations thereof, or a ceramic material.

The present invention also provides a fluid-cooled assembly for use in an electrochemical cell stack comprising at least two gas barriers, wherein a first gas barrier opposes an anode electrode and a second gas barrier opposes a cathode electrode of an adjacent cell and wherein the gas barriers are approximately parallel; and an array of electronically conductive posts disposed across the gas barriers, wherein the electronically conductive posts enable electrical communication with both the anode electrode of a first cell and the cathode electrode of an adjacent cell. The channel formed between the gas barriers provides a flow field for cooling fluids. Preferably, the flow fields formed by the posts for any cooling fluids and for reactant fluids have a void volume of between about 50% and about 99% of the total volume defined by the space between the surface of the gas barrier and the surface of the electrodes that make contact with the posts. More preferably, the flow fields have a void volume of between about 70% and about 99% of the total volume defined by the space between the surface of the gas barrier and the surface of the electrodes that make contact with the posts, and most preferably between about 85% and about 95%.

Certain embodiments of the subassemblies described herein may appropriately be referred to as bipolar plates, but the subassemblies are not limited to bipolar plates. Alternatively, the inventors believe that certain embodiments of the subassemblies, particularly those with gas barriers that are electronically nonconducting, are more appropriately referred to as bipolar assemblies that include multiple bipolar posts. However, these distinctions are not deemed to be limiting of the scope of the invention which is set out by the claims.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION

The present invention provides a bipolar assembly for use in electrochemical stacks. The bipolar assembly is especially well-suited for use in applications with low reactant fluid pressure, as in an airplane flying at high altitudes. The bipolar assembly is lightweight and provides a flow field that operates with a low pressure drop. When used in a fuel cell stack, the bipolar assembly provides a fuel cell stack having a higher power-to-weight ratio. As used herein, the term "bipolar assembly" encompasses separators, bipolar separator plates or any other term of art used to describe a separator between adjacent cells in an electrochemical cell stack. It should be recognized that a bipolar assembly may include elements that are not themselves bipolar.

The bipolar assembly is used in an electrochemical stack to provide a barrier between reactant or product fluids present at the anodes and reactant or product fluids present at the cathodes of the electrochemical stack. The bipolar assembly will also provide anode and cathode flow fields for the reactant or product fluids. Optionally, the bipolar assembly may provide additional internal channels through which cooling fluids may be passed to cool the electrochemical stack.

The bipolar assembly of the present invention comprises a gas barrier and an array of electronically conducting and protruding posts engaged with the gas barrier. While the posts may protrude or extend from the gas barrier in many different manners, the posts must extend in a manner that completes an electronically conducting path between two adjacent cells and secures at least portions of the gas barrier at a spaced distance from the surface of an adjacent cell. For example, in a stack of cells that lie in generally parallel planes, the posts will preferably protrude or extend in a direction approximately perpendicular to the cells. Alternatively, the posts may be disposed at an angle different than perpendicular to the gas barrier. Each end of the posts is in electrical communication with an electrode, gas diffusion layer, current collector, or combination there of. Because the bipolar assembly separates a cathode from an anode, the posts contact an anode of an adjacent cell electrode on one end and a cathode electrode on the other end. The posts provide electronic current conduction through the stack as well as provide the flow fields for the electrochemical reactants.

The posts are made of any electronically conductive material, such as a material selected from graphitic carbon, metal, alloy, aluminum, titanium, magnesium, graphite filled polymeric composites, or metal filled polymeric composites.

The gas barrier lies between a pair of adjacent cells, but does not have to be truly planar. The gas barrier may be formed of electronically conductive materials or, if the posts extend through openings in the gas barrier, nonconductive materials. If there are no openings for the posts to extend through, then the gas barrier must be electronically conductive to complete an electronically conducting path between the pair of adjacent cells. Electronically conductive gas barriers may be constructed of, for example, one or more metals or alloys, such as aluminum, titanium or magnesium, a conductive filled polymer composite, and intrinsically conductive polymer, or graphitic carbon sheet. A preferred electronically conductive gas barrier is made from aluminum.

Especially for applications where weight is a greater consideration than electronic conductivity, the gas barrier may be constructed of lightweight but electronically non-conductive polymer sheet such as, for example, polycarbonate, polytetrafluoroethylene, polyamide, or polyethersulfone. For example, when the gas barrier is not electronically in series between the posts and the adjacent cells, the benefits of having an electronically conducting gas barrier are substantially limited to providing lateral conductivity to the bipolar assembly. While lateral conductivity may provide marginally enhanced performance of the stack, reducing the weight of the gas barrier will typically provide greater benefits in mobile applications. Other suitable gas barrier materials include, without limitation, ceramics, conducting polymer/non-conducting polymer composites, fiber-glass filled epoxy, and carbon-filled, graphite filled, or metal-filled polymer composites.

Optionally, the gas barrier may provide the ability to transfer water between the cathode of one cell and the anode of an adjacent cell while maintaining isolation of the anode and cathode gases. The gas barrier that transfers water can be made from a water permeable material or a composite that includes a water permeable material. Suitable water permeable materials include, but are not limited to, silica, hydrophilic polymers, and cellulose.

The material used to make the gas barrier may also include fillers that promote strength, electronic conductivity, water permeability, or combinations thereof. These properties of the gas barrier may be provided by a single material or a composite. Optionally, the composite may include particles (such as fibers, powders, or pellets) that provide one or more of these properties. Particles suitable for enhancing electronic conductivity include, without limitation, ceramics, metals, alloys, graphite, or combinations thereof. Particles suitable for enhancing strength include, without limitation, silicon carbide, graphite, metals, and ceramics. Particles suitable for enhancing water permeability were set out above. Still other particles may be included to enhance other desirable properties of the composite, such as further reducing the weight, and making the composite hydrophobic or hydrophilic.

Proton exchange membrane fuel cells typically are operated at ambient pressure or above because the power generation from the fuel cells increases as the partial pressure of the reactive gases, oxidizer such as air and fuel, in the fuel cells increases. Power generation increases with increasing pressure because of the large over potential required to drive the oxygen reduction reaction. By increasing the total pressure, the partial pressure of oxygen increases, thereby increasing the rate of the oxygen reduction reaction, which follows first order kinetics with respect to oxygen partial pressure. Additionally, increasing the total pressure increases the diffusion rate of the oxygen to the surface of the electrocatalyst, thereby further increasing the power generation of the fuel cell stack.

Therefore, when operating a fuel cell stack at low pressures, as in an airplane at high altitudes, it becomes critical to consider two design parameters that affect the diffusion resistance of the gas diffusion layer. These parameters are porosity and thickness of the diffusion layer/backing layer. The gas diffusion resistance may be reduced by making the gas diffusion layer/backing layer as thin as possible. However, the gas diffusion layer/backing layer may be designed to perform a variety of functions, such as a microscopic current collector, a catalyst support, a water content controller, a stack tolerance buffer, a thermal expansion absorber, a protective sheet that keeps the membrane from being cut by foreign objects, and a diffusion layer that allows gas to reach portions of the electrocatalyst that are pressed behind the solid flow field supports. Typical gas diffusion layers/backing layers for proton exchange membrane fuel cells have a thickness from about 0.5 mm to 0.25 mm and a porosity from about 35% to 60% by volume.

Another consideration for low-pressure operation of a fuel cell is the thickness of the electrode or electrocatalyst layer.

The design of the electrode or electrocatalyst layer becomes critical at lower pressures as oxygen diffusion through the gas diffusion/backing layers and electrocatalyst layers becomes very slow. The optimal electrode for low-pressure operation is one having the highest surface area of catalyst in the thinnest possible layer next to the proton exchange membrane. Platinum black, an excellent oxygen reduction catalyst, has much higher surface area per electrode volume than supported catalysts. Therefore, platinum black is a preferred catalyst to use for low oxygen pressure applications.

Figure 1:
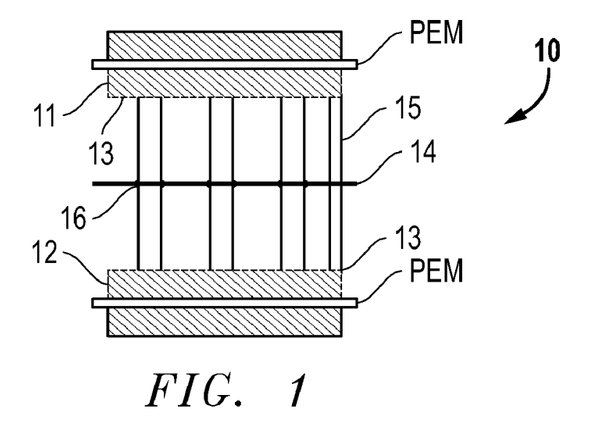
FIG. 1 is a cross sectional view of a bipolar assembly suitable for low-pressure operation in an electrochemical stack.

It should be noted that posts may be disposed in different patterns for one flow field and a different pattern for a second flow field. Furthermore, only one flow field may have posts in accordance with the present invention with the other flow field, being of a different design FIG. 1 is a cross sectional view of a bipolar assembly suitable for low-pressure operation in an electrochemical stack. The gas barrier 14, which may be electronically conducting or non-conducting, separates the reactant fluids flowing across the face of the anode electrode 11 and the cathode electrode 12. A plurality of posts 15 is disposed across the gas barrier 14, each post being approximately perpendicular to the gas barrier. One end of each post contacts the current collector 13 on the anode electrode 11 and the other end of each post contacts the current collector 13 on the cathode electrode 12. The posts and the gas barrier form the "post-type" flow fields for the reactant fluids. One embodiment, as illustrated in FIG. 1, shows the posts 15 inserted through holes in the gas barrier 14, each post being sealed 16 into the hole in the gas barrier through which the post passes, thereby preventing reactant fluids from passing from one side of the gas barrier to the other.

Figure 2:
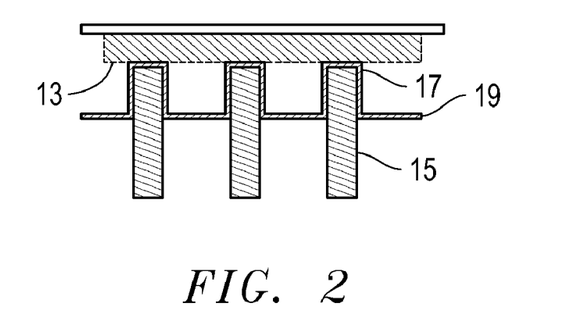
FIG. 2 is a cross sectional view of a bipolar assembly, suitable for low-pressure operation in an electrochemical stack, having a gas barrier with indentations.

Alternatively, the posts may be inserted into indentations on the gas barrier instead of through holes in the gas barrier. FIG. 2 is a cross sectional view of a bipolar assembly having a gas barrier with indentations. One end of the post 15 is inserted into the indentation 17 formed in the gas barrier 19. In this alternative, the gas barrier must be electronically conductive. The indentations in the gas barrier are in electrical communication with the current collector 13 on the electrode. The current then passes from the current collector 13 to the indentations 17 and then to the posts 15. An advantage of using the indentation configuration is that the posts need not be sealed around the holes in the gas barrier.

Figure 3:
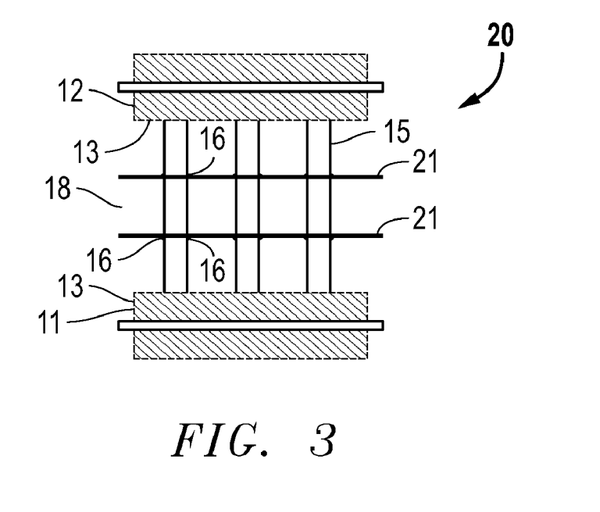
FIG. 3 is a cross sectional view of a bipolar assembly, suitable for low-pressure operation in an electrochemical stack, having an optional cooling channel.

Optionally, the bipolar assembly may include a channel for a cooling fluid for cooling the stack. FIG. 3 is a cross sectional view of a bipolar assembly suitable for low-pressure operation in an electrochemical stack having an optional cooling channel. The cooling channel 18 is formed between two gas barriers 21 through which a coolant may be passed. The posts 15 extend through both gas barriers 21 such that one end of each post touches the current collector 13 of the cathode electrode 12 and the other end of each post touches the current collector 13 of the anode electrode 11. Each post is sealed 16 into the hole in the gas barrier through which the post passes to prevent reactant fluids from mixing with the cooling fluid. Alternatively, one or both gas barriers may include indentations, instead of holes, through which the posts may be inserted as shown in FIG. 2. If the posts 15 are inserted into indentions, then the gas barrier 14 having the indentions must be conductive so that the posts are in electrical communication with the current collectors 13 through the indentations of the gas barrier 14.

The current collector 13, which is part of each electrode, is a metal grid within the electrode forming the core of the gas diffusion structure. The metal acts as a current collector spanning the entire active area of the electrode to collect the electric current. The structure is fully identified and described in U.S. Pat. Nos. 6,054,228 and 6,410,180, which are hereby incorporated by reference. In the present invention, the current collector may be constructed of titanium, nickel, copper, aluminum, stainless steel, graphitized carbon, or other electronically conductive material. The preferred material is titanium because of a combination of titanium's qualities including lightweight, strength, resistance to corrosion and electrical conductivity. Other alternatives may include precious metals such as gold, palladium, ruthenium or platinum. As a further alternative, thin layers of precious metals may be plated onto other metals, thereby protecting the other metals from corrosion.

The current collectors 13 may be made of perforated flat plate or foil, woven wire cloth, non-woven conductive cloth or an ordered grid. The perforations may be of any shape such as circles, squares, triangles or diamonds. The perforations may be drilled, punched or made by any other suitable means. Non-woven conductive cloth may be formed by binding individual strands of wire together using either metallurgical bonding techniques or using a binder. The ordered grid may be made by bonding together strips or rods of conductive material to form a sheet. As another alternative form for the current collector, a thin sheet of metal foam or a porous sheet produced by sintering smaller, typically spherical, particles into a single mass may be used. Whichever of these forms is selected, the open area of the current collector may be between about 20% to 80%. Preferably the open area is between about 40% to about 60% of the total area. To ensure good electrical contact between the current collectors 13 and the posts 15, the size of the holes or open area in the grid should be less than the smallest dimension of the cross section of the post.

The conductive posts 15 may be made of any highly conductive material though it is preferable to use a low-density material to minimize the weight. Suggested materials include, for example, graphitic carbon, aluminum, titanium and magnesium. The distance between the posts should be greater than 1 mm, and may range from between about 1 mm to about 3 cm, but preferably be about 1 cm. The posts may be inserted on a triangular or square pitch. Other pitch geometries are also acceptable. The flow field formed with the posts should consist of between about 90% to 99% open area. The posts should have approximately the same cross sectional shape as the openings in the gas barrier into which the posts are inserted. These shapes may be any regular shape, for example, circular, square, rectangular, triangular, oval, ovoid, pentagonal, or anypolygon. Furthermore, the posts may have different shapes or sizes on either side of the gas barrier. Still, the individual posts on a single bipolar assembly may have different shapes or sizes, such as to direct reactant flow. The posts should have a diameter or cross sectional dimension that provides a tight fit with the openings in the gas barrier. The tight fit will better ensure electrical conductivity between the gas barrier and the posts, if desired, and also minimize the sealing required if the posts are inserted through holes in the gas barrier rather than into indentations. The cross sectional dimension of both the openings in the gas barrier and the posts should be between about 0.150 inch and about 0.050 inch.

If the posts are inserted through holes in the gas barrier, the posts must be sealed to prevent leakage of any fluids across the gas barrier. If both the gas barrier and the posts are metallic, then the posts may be metallurgically bonded, for example, by soldering or brazing, by sealing the region around each post with a metal or alloy that melts at a temperature substantially lower than the metals used to fabricate the barrier or the posts. An alternate method is to electroform the seal by selectively electroplating a seal into the gaps between the gas barrier and the posts.

Preferably, the posts are sealed with polymers. While thermoplastics and polymers deposited from solutions may be used for this function, the preferred method of sealing is with a curable adhesive or sealant such as, for example, epoxies and self-vulcanizing silicones. When conductive gas barriers are used, it is preferable to use a conductive sealant, such as a metal filled epoxy.

When a conductive sealant is used, or when the posts are inserted into indentations in the gas barrier, current may flow from one post, through the gas barrier, to another post. This may help maintain stack performance in a situation where the performance over a small portion of one electrode declines, as can occur when a water drop occludes part of a cathode. The current collectors within the electrode conduct current from post to post and help average the current over all the posts allowing other parts of the electrode to pick up more of the load to compensate. By also allowing current to flow between posts through the gas barriers there is another degree of smoothing to permit the stack to function well, even when a small area is performing below standard.

The gas barriers 14 may be formed of conductive or nonconductive materials if the openings in the gas barrier are holes. If the openings are indentations, then the gas barrier should be electronically conductive to transport current from the current collector at the electrodes to the posts inserted within the indentations. For conductive gas barriers, preferred materials of construction may be aluminum, titanium, magnesium, a conductive filled polymer composite, and intrinsically conductive polymer, or graphitic carbon sheet with aluminum being the most preferred. If weight is a greater consideration than conductivity, the gas barrier may be constructed of polymer sheet such as, for example, polycarbonate, polytetrafluoroethylene, polyamide, or polyethersulfone.

The gas barrier may also be made of hydrophilic polymer, such as NAFION. NAFION is a registered trademark of DuPont of Wilmington, Del. The use of a hydrophilic polymer may be useful in forming cooling channels. Since water is produced at the cathode of a fuel cell, water may be transported from the cathode side of the gas barrier, through the gas barrier, to the cooling stream passing through the cooling channel. Water produced at the cathode will evaporate into the unsaturated gas stream in the cathode flow field. As long as the cooling stream is cooler than the stack, some water will condense onto the cool surface of the gas barrier and be absorbed into the gas barrier. If water is used as the cooling stream, water may also pass from the cooling channel, through the gas barrier, and into the anode side to humidify the fuel and replace water that is lost by electroosmosis through the proton exchange membrane. As an alternative, one side of the cooling chamber may have a hydrophilic polymer and the other side may have a sealed gas barrier, for example, made of metal. A hydrophilic barrier used on the anode side and a sealed barrier on the cathode side, for example, would allow water to hydrate the fuel on the anode side but prevent water from leaving the cathode side through the gas barrier and thereby maintain the water balance on the cathode side.

Figure 5:
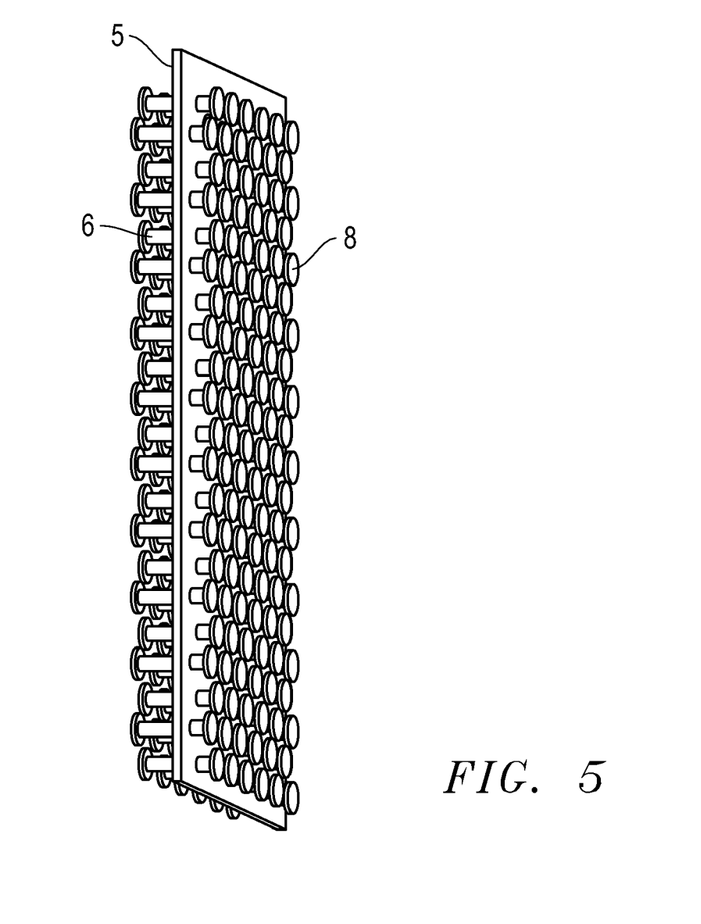
FIG. 5 is a perspective view of a bipolar plate having posts with membrane supports in accordance with the present invention.

FIG. 5 shows a perspective view of a bipolar assembly having posts with membrane supports in accordance with the present invention in lieu of a current collector that covers the entire active surface of the electrode. When the current collector covers the entire active surface of the electrode, there may be a decrease in the ability of the gas to diffuse to the electrocatalyst. In this embodiment, each post may have a membrane support 8 attached to each end of the posts 6. The membrane supports may be electronically conducting, not electronically conducting, or a mixture of electronically conducting and electronically nonconducting membrane supports. Furthermore, the membrane supports may be shaped as a disk, as a star, "t" shaped, triangular or any other shape. The membrane supports replace the current collector that completely covers the active area of the electrode. Alternatively, the ends of the posts may be grooved, instead of using membrane supports, to allow gas to access the gas diffusion layer and electrocatalyst covered by the ends of the posts.

Figure 6:
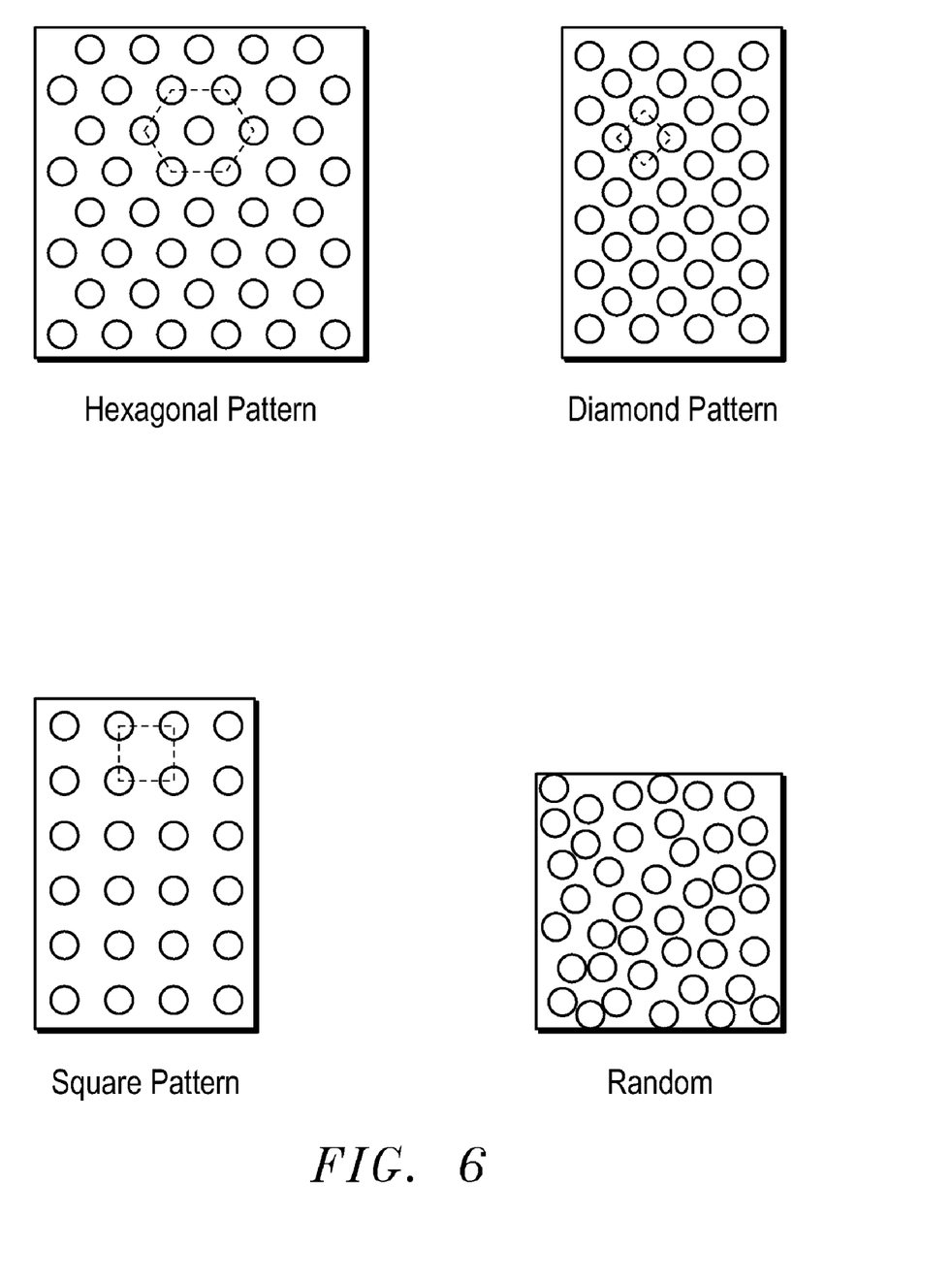
FIG. 6 shows examples of different arrangements of posts that may be used in accordance with the present invention.

FIG. 6 shows examples of different arrangements of posts that may be used in accordance with the present invention. The posts may be arranged in a hexagonal pattern, a diamond pattern, a square pattern or a random pattern. These patterns are shown as examples only as the pegs may be arranged in any desired pattern in accordance with the present invention.

Figure 7:
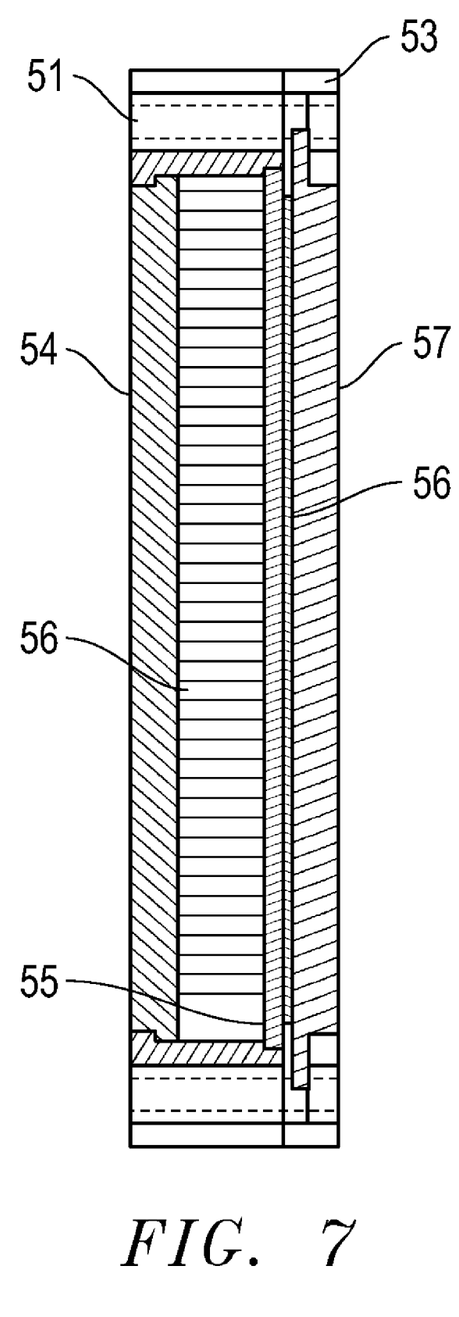
FIG. 7 shows a cross section of an assembly having a foam bipolar unit in accordance with the present invention.
Figure 8A:
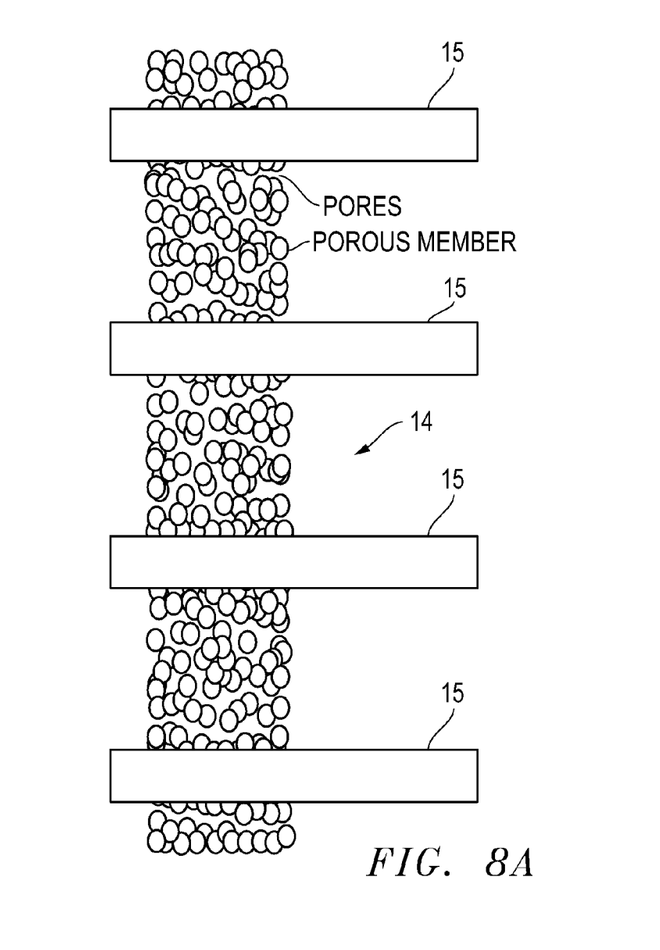
FIG. 8A shows a section of an assembly with pores communicating between the anode and cathode compartments.
Figure 8B:
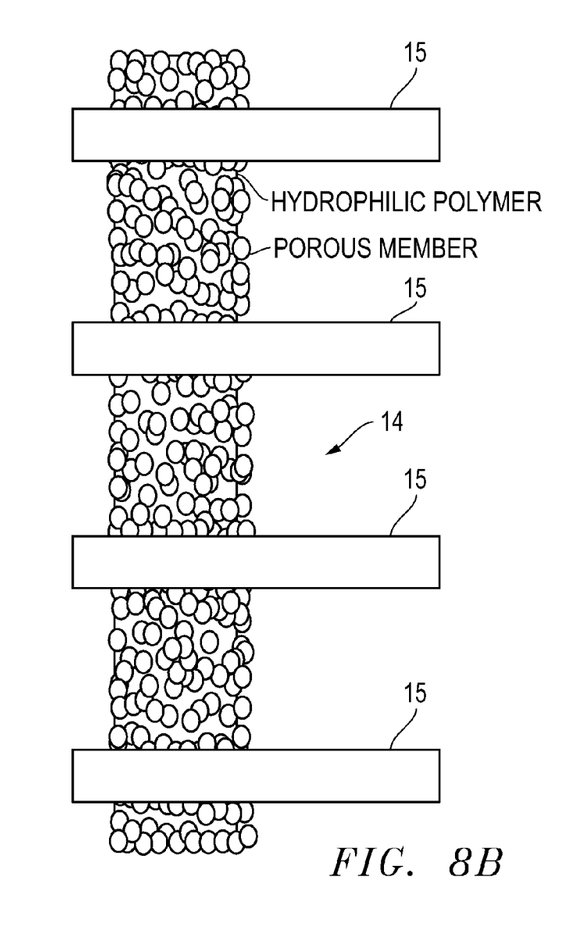
FIG. 8B shows the assembly of FIG. 8A, with the pores filled with a hydrophilic polymer to furnish a means to transfer water from the cathode to the anode of an adjacent cell.

FIG. 7 shows a cross section of an assembly having a foam bipolar unit in accordance with the present invention

EXAMPLE

A bipolar assembly having a post-type flow field was fabricated. The bipolar assembly was fabricated using two 15 mil (0.38 mm) thick gold plated titanium gas barrier sheets, two flow field frames fabricated from Kynar™ polymer to be used with the air and hydrogen flow fields, and a high density polyethylene frame for the cooling flow field. The posts consisted of ⅛ inch thick carbon spectroscopy rods cut to the correct length. The frames were bonded to the gas barriers with 5 mil (0.127 mm) thick acrylic double-sided tape from 3M™.

Thirty-six evenly spaced ⅛ inch holes were drilled into the separator plates in the area of the flow fields. These plates were aligned and sealed to the cooling flow field frame with the double-sided tape. The hydrogen and air flow field frames were then sealed to the separator plates with the same double-sided tape. The spectroscopy rods were cut up into short pieces to match the thickness of the bipolar assembly. The rods were inserted through the holes in the separator plate, sealed to the separator plates with an epoxy and cured in an oven at 100° C. for two hours.

Two membrane and electrode assemblies were created, each using a sheet of conventional ELAT™ carbon powder on carbon cloth gas diffusion media from the E-Tek Division of DeNora. Then gold plated 60 ppi Ni foam was pressed into both sides of each MEA to infuse the ELAT with a porous metal conductive grid.

Figure 4:
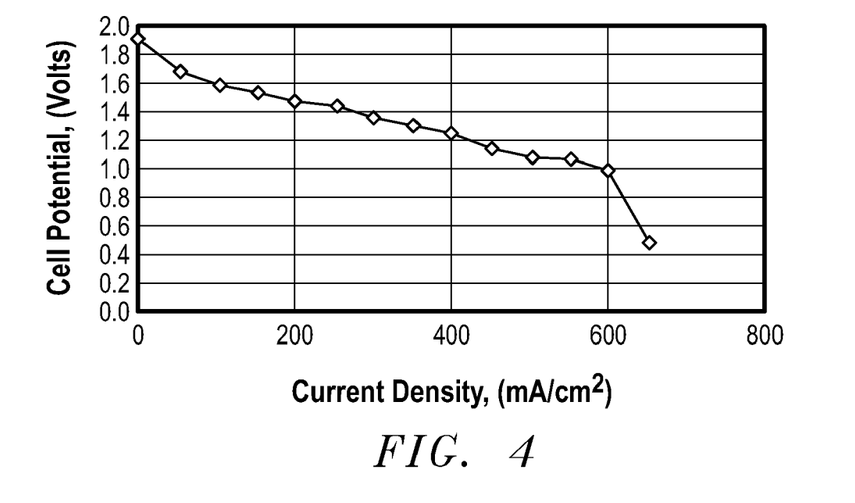
FIG. 4 is a graph of a fuel cell stack's operation having a post-type flow field.

The MEAs and bipolar assembly were assembled into a two-cell stack and tested at 14.7 psia. The data from this experiment is shown in FIG. 4. The high frequency resistance was approximately 7.0 mOhms, which, at approximately double the normal single cell value, was the value expected for a two-cell stack. The data shows that a lightweight bipolar assembly of the post-type flow field design is feasible and can be used as a fuel cell structure.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A fluid-cooled assembly for use in an electrochemical cell stack comprising:
   at least two gas barriers, wherein a first gas barrier opposes an anode electrode and a last gas barrier opposes a cathode electrode and wherein the gas barriers are approximately parallel; and
   an array of electronically conductive protrusions disposed across the gas barriers, wherein the electronically conductive protrusions enable electrical communication between the anode electrode and the cathode electrode, wherein the protrusions are inserted into an array of holes, indentations, or combinations thereof in the gas barriers, and wherein the protrusions have a cross section approximately matching a cross section of the holes or indentations, and wherein the gas barriers and the protrusions are metallic; and
   seals around the protrusions formed by metallurgically bonding the protrusions to the gas barriers, wherein the seal is formed with a metal having a melting point substantially lower than the metals of the protrusions or the gas barriers.

2. The assembly of claim 1, wherein the protrusions are sealed to indentations, and the gas barrier is electronically conductive.

3. The assembly of claim 1, wherein the protrusions are of any cross sectional shape.

4. The assembly of claim 1, wherein the protrusions have cross sectional shapes selected from circular, square, rectangular, triangular, diamond, oval, ovoid, pentagonal, hexagonal or heptagonal.

5. The assembly of claim 1, wherein the protrusions are arranged in a pattern selected from triangular or rectangular.

6. The assembly of claim 4, wherein the separation between protrusions is from 1 mm to 3 cm.

7. The assembly of claim 4, wherein the separation between protrusions is from 1 cm to 2 cm.

8. The assembly of claim 1, wherein the protrusions extend between adjacent cells through a distance between ½ inch and 1/16 inch.

9. The assembly of claim 1, wherein the anode electrode and the cathode electrode each have a fluid diffusion structure having an electronically conductive grid, wherein the metal grid acts as a current collector.

10. The assembly of claim 9, wherein the protrusions are in electrical communication with the grids.

11. The assembly of claim 9, wherein the grid is made of material selected from nickel, copper, aluminum, stainless steel, graphitized carbon, gold, palladium, ruthenium, platinum or combinations thereof.

12. The assembly of claim 9, wherein the grid is made of titanium.

13. The assembly of claim 9, wherein the grid is a form selected from perforated flat plate, perforated foil, woven wire cloth, non-woven conductive cloth, wherein the perforations or openings have a size less than the area of contact with any one of the protrusions.

14. The assembly of claim 1, wherein the gas barrier is porous with pores permitting fluid communication through the plate and said pores filled with a hydrophilic material that prevents the passage of gas through the gas barrier but permits the passage of water.

15. The assembly of claim 14 where the hydrophilic material is a polymer.

16. The assembly of claim 15 where the polymer is selected from poly-perfluorosulfonic acid, sulfonated polystyrene, sulfonated trifluorostyrene, polyacrylamides, sulfonated styrene copolymers, and blends and copolymers of these materials.

17. The assembly of claim 14 where the hydrophilic material is an inorganic material.

18. The assembly of claim 17 where the inorganic material is selected from phosphates, polyphosphates, hydrous silicates, and the like.

19. The assembly of claim 1, wherein the protrusions form flow fields having a void volume of between about 50% and about 99%.

20. The assembly of claim 1, wherein the protrusions form flow fields having a void volume of between about 80% and about 95%.

21. The assembly of claim 1, wherein at least one of the fluids is a gas.

22. A fluid-cooled assembly for use in an electrochemical cell stack comprising:
   at least two gas barriers, wherein a first gas barrier opposes an anode electrode and a last gas barrier opposes a cathode electrode and wherein the gas barriers are approximately parallel; and
   an array of electronically conductive protrusions disposed across the gas barriers, wherein the electronically conductive protrusions enable electrical communication between the anode electrode and the cathode electrode, and wherein the protrusions have a cross section approximately matching a cross section of the holes or indentations, wherein the protrusions are inserted into holes in the gas barriers; and
   seals around the protrusions, wherein the seals are made of polymeric material.

23. The assembly of claim 22, wherein the polymeric material is selected from epoxies, metal filled epoxies, carbon filled epoxies, self-vulcanizing silicones, metal filled self-vulcanizing silicones, or carbon filled self-vulcanizing silicone.

24. The assembly of claim 22, wherein the gas barriers are made of materials selected from electronically conducting materials, electronically nonconducting material, or combinations thereof.

25. The assembly of claim 22, wherein the protrusions are made of material selected from graphitic carbon, aluminum, titanium or magnesium.

26. The assembly of claim 22, wherein the protrusions are made of any electronically conductive material.

27. The assembly of claim 22, wherein the gas barrier is electronically conductive, the gas barrier is made of material selected from aluminum, titanium, magnesium, or graphitic carbon sheet.

28. The assembly of claim 22 wherein the gas barrier is electronically conductive, the gas barrier is made of a material selected from conductive polymer composites formed from a non-conductive polymer filled with a conductive material such as metal or carbon.

29. The assembly of claim 22 wherein the gas barrier is made of an intrinsically electronically conductive polymer.

30. The assembly of claim 22, wherein the gas barrier is electronically nonconductive, and wherein the gas barrier is made of polymer selected from polycarbonate, polytetrafluoroethylene, polyamide, or polyethersulfone.

31. The assembly of claim 30, wherein the gas barrier is porous with pores permitting fluid communication through the plate and said pores filled with a hydrophilic material that prevents the passage of gas through the gas barrier but permits the passage of water.

32. The assembly of claim 31 where the hydrophilic material is a polymer.

33. The assembly of claim 32 where the polymer is selected from poly-perfluorosulfonic acid, sulfonated polystyrene, sulfonated trifluorostyrene, polyacrylamides, sulfonated styrene copolymers, and blends and copolymers of these materials.

34. The assembly of claim 31 where the hydrophilic material is an inorganic material.

35. The assembly of claim 34 where the inorganic material is selected from phosphates, polyphosphates, hydrous silicates, and the like.

36. The assembly of claim 22, wherein all the gas barriers are made of the same material.

37. The assembly of claim 22, wherein all the gas barriers are not made of the same materials.

38. The assembly of claim 22, wherein at least two gas barriers are electronically conductive, and wherein the electronically conductive protrusions are inserted into an array of holes, indentations or combinations thereof in the at least two gas barriers.

39. The assembly of claim 38, wherein the at least two gas barriers and the protrusions are metallic.

40. The assembly of claim 38, wherein the protrusions are of circular cross sectional shape.

41. The assembly of claim 38, wherein the protrusions have cross sectional shapes selected from circular, square, rectangular, triangular, diamond, oval, ovoid, pentagonal, hexagonal, or heptagonal.

42. The assembly of claim 38, wherein the protrusions are arranged in a pattern selected from triangular or rectangular.

43. The assembly of claim 42, wherein the separation between protrusions is between about 1 mm and about 3 cm.

44. The assembly of claim 43, wherein the separation between protrusions is about 1 cm.

45. The assembly of claim 38, wherein the protrusions extend between adjacent cells through a distance between $\frac{1}{4}$ inch and $\frac{1}{16}$ inch.

46. The assembly of claim 38, wherein the protrusions are made of material selected from graphitic carbon, aluminum, titanium, or magnesium.

47. The assembly of claim 38, wherein the gas barrier is made of material selected from aluminum, titanium, magnesium, or graphitic carbon sheet.

48. The assembly of claim 38, wherein the gas barrier is made of a conductive polymer composite formed from a non-conductive polymer filled with a conductive material.

49. The assembly of claim 38, wherein the protrusions form flow fields having a void volume of between about 50% and about 99%.

50. The assembly of claim 38, wherein the protrusions form flow fields having a void volume of between about 80% and about 95%.

51. The assembly of claim 38, wherein the two gas barriers are not made of the same material.

52. The assembly of claim 38, wherein the two gas barriers are made of the same material.

53. The assembly of claim 22, wherein the gas barriers are made from different material than the protrusions.

* * * * *

UNITED STATES PATENT AND TRADEMARK OFFICE
CERTIFICATE OF CORRECTION

PATENT NO. : 7,125,625 B2
APPLICATION NO. : 10/448974
DATED : October 24, 2006
INVENTOR(S) : Alan Cisar et al.

It is certified that error appears in the above-identified patent and that said Letters Patent is hereby corrected as shown below:

Column 1, line 3 insert the following: --This invention was made with government support under grant number 5 R44 HL63542-03 awarded by the National Institutes of Health (NIH). The government has certain rights in this invention.--

Signed and Sealed this

Second Day of January, 2007

JON W. DUDAS
*Director of the United States Patent and Trademark Office*